(12) United States Patent
Murata

(10) Patent No.: US 9,261,066 B2
(45) Date of Patent: Feb. 16, 2016

(54) IGNITION TIMING CONTROL DEVICE AND IGNITION TIMING CONTROL METHOD FOR INTERNAL COMBUSTION ENGINE

(75) Inventor: Masaya Murata, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 932 days.

(21) Appl. No.: 13/480,586

(22) Filed: May 25, 2012

(65) Prior Publication Data

US 2012/0298073 A1    Nov. 29, 2012

(30) Foreign Application Priority Data

May 25, 2011    (JP) ................. 2011-116931

(51) Int. Cl.
| | |
|---|---|
| *F02P 5/12* | (2006.01) |
| *F02P 5/152* | (2006.01) |
| *F02D 19/08* | (2006.01) |
| *F02P 5/15* | (2006.01) |

(52) U.S. Cl.
CPC ............ *F02P 5/1527* (2013.01); *F02D 19/084* (2013.01); *F02D 19/088* (2013.01); *F02D 2200/0414* (2013.01); *F02D 2200/0611* (2013.01); *F02D 2200/0612* (2013.01); *F02P 5/1502* (2013.01); *Y02T 10/36* (2013.01); *Y02T 10/46* (2013.01)

(58) Field of Classification Search
CPC .... F02P 5/1527; F02P 5/1502; F02D 19/084; F02D 19/088; F02D 2200/0611; F02D 2200/0612; F02D 2200/0414; Y02T 10/46; Y02T 10/36
See application file for complete search history.

(56) References Cited

U.S. PATENT DOCUMENTS

| | | | | |
|---|---|---|---|---|
| 4,947,817 A | * | 8/1990 | Ido ......................... | F02P 5/1527 123/406.32 |
| 4,993,386 A | * | 2/1991 | Ozasa ...................... | F01M 3/02 123/1 A |
| 5,327,866 A | * | 7/1994 | Kitajima ................ | F02D 41/0025 123/1 A |
| 7,735,469 B2 | * | 6/2010 | Miyata ................... | F02D 11/105 123/399 |
| 2007/0034192 A1 | * | 2/2007 | Kamio .................... | F02B 47/02 123/478 |
| 2009/0205613 A1 | * | 8/2009 | Kawakita ................ | F02D 37/02 123/406.44 |
| 2010/0012081 A1 | * | 1/2010 | Ashizawa .............. | F02B 23/101 123/301 |

FOREIGN PATENT DOCUMENTS

| | | |
|---|---|---|
| JP | 03-111664 A | 5/1991 |
| JP | 06-323224 A | 11/1994 |
| JP | 2007-056773 A | 3/2007 |
| JP | 2007-327430 A | 12/2007 |
| JP | 2008-115804 A | 5/2008 |
| JP | 2008-309047 A | 12/2008 |
| JP | 2009-024551 A | 2/2009 |
| JP | 2010-037970 A | 2/2010 |
| JP | 2010-203397 A | 9/2010 |

* cited by examiner

*Primary Examiner* — Hieu T Vo
*Assistant Examiner* — Sherman Manley
(74) *Attorney, Agent, or Firm* — Dinsmore & Shohl LLP

(57) ABSTRACT

An ignition timing control device for an internal combustion engine includes a retarding portion and a prohibiting portion. The retarding portion retards ignition timing according to a parameter that correlates with temperature inside a combustion chamber. The prohibiting portion prohibits the retarding portion from retarding the ignition timing when alcohol concentration in blended fuel is greater than or equal to a predetermined value. The internal combustion engine uses the blended fuel in which an alcohol fuel and a gasoline fuel are blended at arbitrary proportion.

9 Claims, 4 Drawing Sheets

IGNITION TIMING CONTROL DEVICE AND IGNITION TIMING CONTROL METHOD FOR INTERNAL COMBUSTION ENGINE

CROSS REFERENCE TO RELATED APPLICATIONS

This application claims priority to Japanese Patent Application No. 2011-116931 filed on May 25, 2011, which is incorporated herein by reference in its entirety including the specification, drawings and abstract.

BACKGROUND OF THE INVENTION

1. Field of the Invention

The invention relates to an ignition timing control device and an ignition timing control method for an internal combustion engine.

2. Description of Related Art

In the internal combustion engines, knocking is more likely to occur as the temperature in the combustion chamber increases or as the octane number of the fuel decreases. Therefore, in a device described in Japanese Patent Application Publication No. 06-323224 (JP 06-323224 A), occurrence of knocking is suitably suppressed by retarding the ignition timing according to the octane number of the fuel and the intake air temperature, which is a parameter that correlates with the temperature inside the combustion chamber.

The related-art devices are configured to correct the ignition timing to retard when the intake air temperature is high. That is, the ignition timing is corrected when the intake air temperature is high. Retarding the ignition timing is likely to result in reduced engine output while being able to suppress occurrence of knocking. As a result, for example, fuel economy and drivability are likely to deteriorate.

SUMMARY OF THE INVENTION

The invention provides an ignition timing control device and an ignition timing control method for an internal combustion engine which suppresses reduction in engine output while suppressing occurrence of knocking.

An ignition timing control device for an internal combustion engine as a first aspect of the invention includes a retarding portion that retards ignition timing according to a parameter that correlates with temperature inside a combustion chamber of the internal combustion engine and a prohibiting portion that prohibits the retarding portion from retarding the ignition timing when alcohol concentration in blended fuel in which an alcohol fuel and a gasoline fuel are blended at arbitrary proportion is greater than or equal to a predetermined value, wherein the blended fuel is used in the internal combustion engine.

A blended fuel with high alcohol concentration is high in octane number, and therefore is less prone to knocking, even when the temperature inside the combustion chamber is high. Therefore, in the first aspect of the invention, when the alcohol concentration in the blended fuel is greater than or equal to the predetermined value and a fuel less prone to knocking is being used, the retarding the ignition timing according to the temperature inside the combustion chamber is prohibited. Therefore, reduction in engine output is restrained while occurrence of knocking is suppressed.

An ignition timing control device for an internal combustion engine as a second aspect of the invention includes a retarding portion that retards ignition timing according to a parameter that correlates with temperature inside a combustion chamber and a prohibiting portion that prohibits the retarding portion from retarding the ignition timing when the internal combustion engine is using a high octane number fuel that is higher in octane number than a gasoline fuel, wherein a fuel that the internal combustion engine uses is one of the gasoline fuel and the high octane number fuel.

When a high octane number fuel that is higher in octane number than gasoline fuel is being used as an engine fuel, knocking is less likely to occur, even if the temperature inside the combustion chamber is high. Therefore, in the second aspect of the invention, when a high octane number fuel is being used as an engine fuel, that is, when a fuel less prone to knocking is being used, the retarding the ignition timing according to the temperature inside the combustion chamber is prohibited. Therefore, reduction in engine output is restrained while occurrence of knocking is suppressed.

An ignition timing control method for an internal combustion engine as a third aspect of the invention includes retarding ignition timing according to a parameter that correlates with temperature inside a combustion chamber of the internal combustion engine and prohibiting the retarding when alcohol concentration in a blended fuel in which an alcohol fuel and a gasoline fuel are blended at arbitrary proportion is greater than or equal to a predetermined value, wherein the blended fuel is used in the internal combustion engine.

An ignition timing control method for an internal combustion engine as a fourth aspect of the invention includes retarding ignition timing according to a parameter that correlates with temperature inside a combustion chamber of the internal combustion engine and prohibiting the retarding when the internal combustion engine is using the high octane number fuel wherein a fuel that the internal combustion engine uses is any one of the gasoline fuel and the high octane number fuel.

The third aspect of the invention has a same advantage as the first aspect. The fourth aspect of the invention has a same advantage as the second aspect.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

First Embodiment

A first embodiment in which an ignition timing control device for an internal combustion engine in accordance with the invention is embodied will be described hereinafter with reference to FIGS. 1 to 3.

Figure 1:
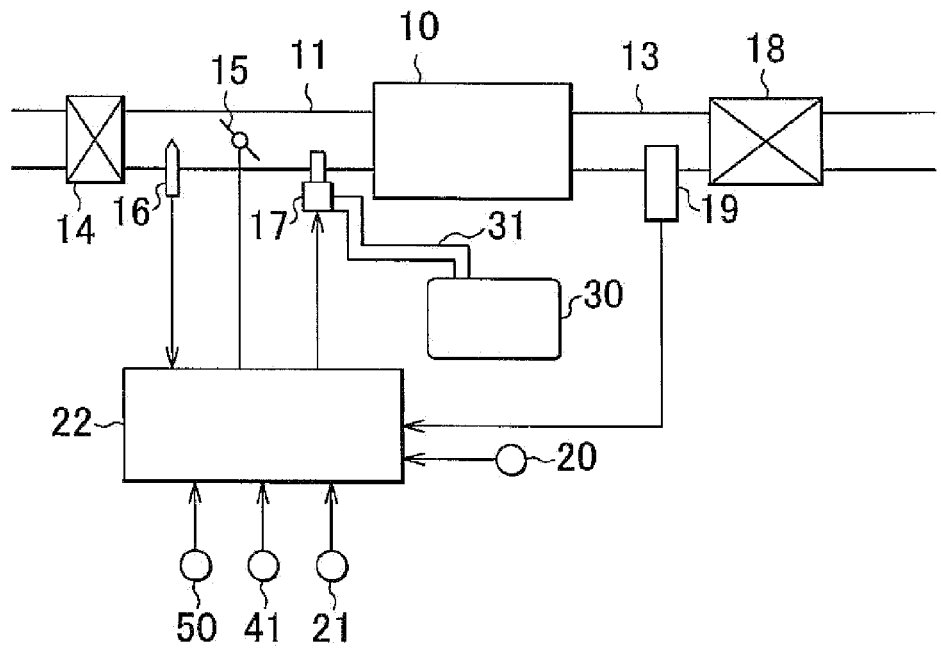
FIG. 1 is a schematic diagram showing an internal combustion engine and its peripheral construction to which an ignition timing control device in accordance with a first embodiment of the invention is applied.
Figure 2:
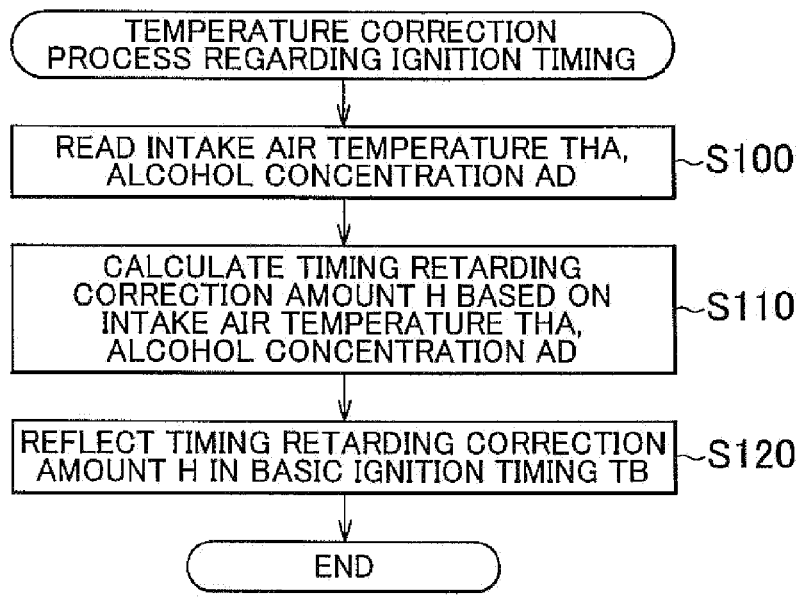
FIG. 2 is a flowchart showing a procedure of a temperature correction process with regard to the ignition timing in the first embodiment.

As shown in FIG. 1, an intake passageway 11 of an internal combustion engine 10 is provided with a throttle valve 15 that variably sets (changes) the passageway area. Due to a control of the degree of opening of the throttle valve 15, the amount of air taken in via an air cleaner 14 is adjusted. The amount of air taken in (intake air amount) is detected by an air flow meter 16.

An injector 17 that injects fuel is provided downstream of the throttle valve 15. The injector 17 is supplied with fuel from a fuel tank 30 through a fuel supply passageway 31. The fuel tank 30 stores blended fuel in which alcohol fuel and gasoline fuel are blended at an arbitrary proportion. Incidentally, the proportion of the alcohol fuel in the blended fuel changes in the range of 0% to 100%. That is, the fuel assumed to be used in the internal combustion engine 10 includes a simple alcohol fuel (i.e., the case where the proportion of alcohol fuel in blended fuel is "100%"), a simple gasoline fuel (i.e., the case where the proportion of gasoline fuel in blended fuel is "100%"), and a fuel in which alcohol fuel and gasoline fuel are blended.

The air taken into the intake passageway 11 is mixed with the fuel injected from the injector 17, and then is sent into the combustion chamber of the internal combustion engine 10, and is burned therein. On the other hand, an exhaust passageway 13 into which exhaust gas produced by combustion in the combustion chamber is sent is provided with an exhaust control catalyst 18 that purifies exhaust gas. The exhaust gas control function of the catalyst 18 is accomplished by controlling the air/fuel ratio of mixture to an appropriate state.

The internal combustion engine 10 is provided with various sensors and switches for detecting states of engine operation. For example, the air flow meter 16 that detects the intake air amount GA is provided upstream of the throttle valve 15. Besides, a cooling system of the internal combustion engine is provided with a coolant temperature sensor 20 that detects engine coolant temperature THW, and a lubrication system is provided with an oil temperature sensor 21 that detects the oil temperature of lubricating oil. Besides, the exhaust passageway 13 upstream of the catalyst 18 is provided with an air/fuel ratio sensor 19 that detects the oxygen concentration in exhaust gas. An air/fuel ratio AF of mixture is detected on the basis of the oxygen concentration detected by the air/fuel ratio sensor 19. Furthermore, the intake passageway 11 is provided with an intake air temperature sensor 41 that detects the temperature of intake air (intake air temperature THA). A rotation speed sensor that detects engine rotation speed NE is provided near the crankshaft of the internal combustion engine 10. An engine block of the internal combustion engine 10 is provided with a knocking sensor 50 that detects occurrence of knocking.

Outputs of these sensors and switches are input to a control device 22. This control device 22 is constructed mainly of a microcomputer that includes a central processing control unit (CPU), a read-only memory (ROM) in which various programs and maps are stored beforehand, a random access memory (RAM) for temporarily storing results of computations performed by the CPU and the like, an input interface, an output interface, etc. The control device 22 performs various controls of the internal combustion engine 10, for example, a fuel injection control of the injector 17, an opening degree control of the throttle valve 15, the ignition timing control of ignition plugs, etc.

The control device 22 also performs a so-called air/fuel ratio control of correcting the amount of fuel injected from the injector 17 on the basis of the air/fuel ratio AF detected by the air/fuel ratio sensor 19, in order to make the air/fuel ratio of mixture equal to a target air/fuel ratio (e.g., the stoichiometric air/fuel ratio, or the like). In this air/fuel ratio control, if the air/fuel ratio AF becomes richer than the stoichiometric air/fuel ratio, a correction of reducing the amount of fuel injection (reducing correction) is performed, and if the air/fuel ratio AF becomes leaner than the stoichiometric air/fuel ratio, a correction of increasing the amount of fuel injection (increasing correction) is performed.

Besides, if occurrence of knocking is detected by the knocking sensor 50, the control device 22 performs a so-called knocking control of retarding the ignition timing until the knocking subsides. In this knocking control, basic ignition timing TB is calculated on the basis of the engine rotation speed NE and the engine load. The basic ignition timing TB is calculated as a most advanced ignition timing that suppresses occurrence of knocking. Besides, according to the situation of occurrence of knocking, a knocking correction amount is calculated, and the basic ignition timing TB is retarded by the knocking correction amount KH. In this manner, according to the situation of occurrence of knocking, a feedback control of the ignition timing is performed.

The alcohol concentration AD in blended fuel may be directly detected by using, for example, a sensor that detects the alcohol concentration on the basis of the electroconductivity of the fuel, the electrostatic capacity thereof, or the like. However, in the first embodiment, the alcohol concentration AD is detected by estimating the alcohol concentration AD in a manner described below, without using such a sensor.

In the internal combustion engine 10, the air/fuel ratio control is performed as described above. The amount of fuel injection needed to obtain the target air/fuel ratio tends to increase as the alcohol concentration in fuel increases. Therefore, in the first embodiment, the control device 22 performs a process of estimating the alcohol concentration AD in blended fuel on the basis of the fuel injection amount required in order to maintain the target air/fuel ratio during operation of the engine. In this estimation, the estimated value of the alcohol concentration AD is set at a higher value as the fuel injection amount is larger. Incidentally, in the case where estimation of the alcohol concentration is performed, the alcohol concentration AD may be estimated on the basis of the fuel injection amount provided when the degree of difference between the actual air/fuel ratio and the target air/fuel ratio is sufficiently small and that state has continued for a certain period. By performing this, the accuracy of estimation of the alcohol concentration AD can be increased.

Furthermore, the control device 22 corrects the ignition timing on the basis of temperature (temperature correction) at the time of setting the ignition timing, by correcting the basic ignition timing TB so that the basic ignition timing TB is retarded (timing retarding correction) on the basis of the intake air temperature THA that correlates with the temperature inside the combustion chamber. Hereinafter, a procedure of a temperature correction process regarding the ignition timing will be described with reference to a flowchart shown in FIG. 2. Incidentally, execution of this process is repeated by the control device 22 at every predetermined cycle.

After the process starts, firstly the intake air temperature THA and the alcohol concentration AD are read (S100), and a timing retarding correction amount H is calculated on the basis of the intake air temperature THA and the alcohol concentration AD (S110). This timing retarding correction amount H is a value of the temperature correction of the ignition timing. As the timing retarding correction amount ET is larger, the ignition timing is corrected to be more retarded so as to restrain occurrence of knocking.

Figure 3:
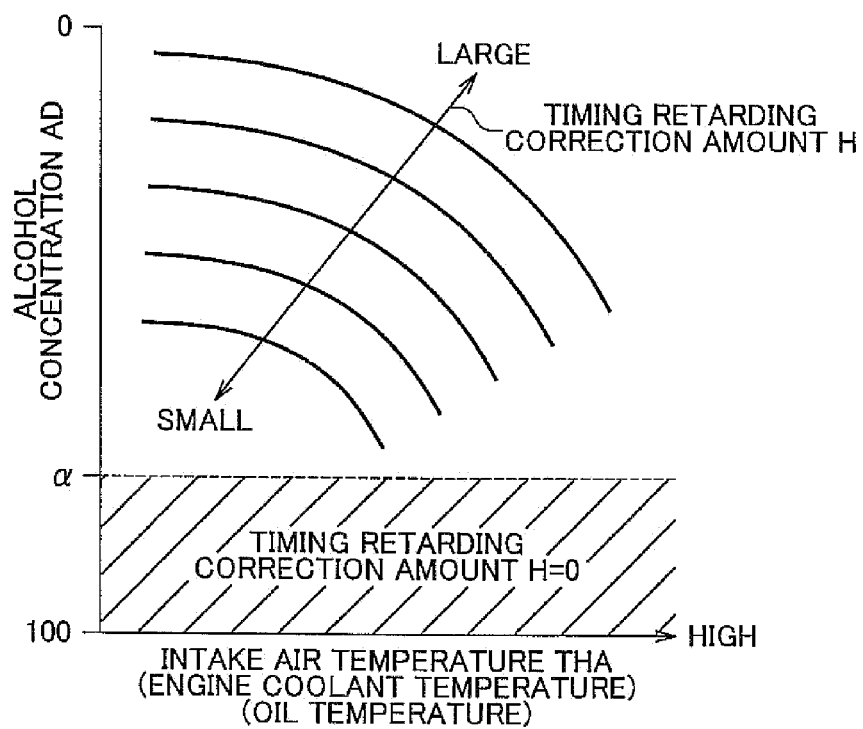
FIG. 3 is a conceptual diagram showing relations of the timing retarding correction amount with the intake air temperature and the alcohol concentration in the first embodiment.

FIG. 3 shows relations of the timing retarding correction amount H with the intake air temperature THA and with the alcohol concentration AD. As shown in FIG. 3, when the alcohol concentration AD is less than a predetermined value α, the timing retarding correction amount H is variably set (changed) on the basis of the intake air temperature THA and the alcohol concentration AD. More specifically, since knocking is more likely to occur as the intake air temperature THA is higher, the value of the timing retarding correction amount H is set larger the higher the intake air temperature MA. Besides, knocking is less likely to occur as the alcohol concentration AD is higher and therefore the octane number of fuel is higher. Therefore, even when the intake air temperature THA remains the same, the value of the timing retarding correction amount H may be made smaller if the octane number is higher. Hence, the timing retarding correction amount H is set smaller as the alcohol concentration AD increases. That is, the timing retarding correction amount H is set larger as the intake air temperature THA increase or as the alcohol concentration AD decrease. In consequence, the ignition timing is more retarded when knocking is more likely to occur.

On another hand, when the alcohol concentration AD is greater than or equal to the predetermined value α and therefore the octane number of fuel is high, the timing retarding correction amount H is fixed to "0". That is, when the alcohol concentration AD is greater than or equal to the predetermined value α, the temperature correction of the ignition timing is substantially prohibited by fixing the timing retarding correction amount H at "0". More specifically, when the alcohol concentration AD is greater than or equal to the predetermined value α and the octane number of fuel is high is when the octane number is high to such an extent that knocking does not occur in the condition that the intake air temperature THA is a highest temperature during operation of the engine. That is, the predetermined value is set to a value at which knocking does not occur in the condition that the parameter is a highest temperature during operation of the engine.

After the timing retarding correction amount H is calculated in this manner, the temperature correction of the basic ignition timing TB is performed in step S120 by correcting the basic ignition timing TB by the timing retarding correction amount H. After that, this process is temporarily ended.

Next, operation of the first embodiment will be described. Since a blended fuel with high alcohol concentration AD is high in octane number, such a blended fuel makes knocking relatively unlikely to occur even when the intake air temperature THA is high. Therefore, in the first embodiment, when the alcohol concentration AD in the blended fuel is greater than or equal to the predetermined value α, that is, when a fuel less prone to knocking is being used, the timing retarding correction amount H is set at "0". This substantially prohibits the retarding correction B of the ignition timing according to the intake air temperature THA. Therefore, when a fuel less prone to knocking is being used, the reduction in engine output that results from the retardation of the ignition timing made by the temperature correction is restrained.

Besides, when the alcohol concentration AD is less than the predetermined value α, the timing retarding correction amount H of the ignition timing is made smaller as the alcohol concentration AD is higher. Thus, since the timing retarding correction amount H of the ignition timing is made smaller when the alcohol concentration AD of blended fuel is higher and therefore knocking is less likely to occur, the reduction in engine output caused by retardation of the ignition timing is restrained.

According to the foregoing first embodiment, the following effects can be attained. First, the timing retarding correction amount H of the ignition timing is set according to the intake air temperature THA. The timing retarding correction amount H is set at "0" when the alcohol concentration AD in blended fuel is greater than or equal to the predetermined value α. This prohibits the timing retarding correction of the ignition timing according to the intake air temperature THA. Therefore, it is possible to suppress reduction in engine output while suppressing occurrence of knocking.

Secondly, when the alcohol concentration AD is less than the predetermined value α, the timing retarding correction amount H is smaller as the alcohol concentration AD is higher. Therefore, it is possible to suitably suppress reduction in engine output while suppressing occurrence of knocking. In the first embodiment, the processes in steps S100, S110 and S120 may be regarded as a retarding portion and a prohibiting portion.

Second Embodiment

Figure 4:
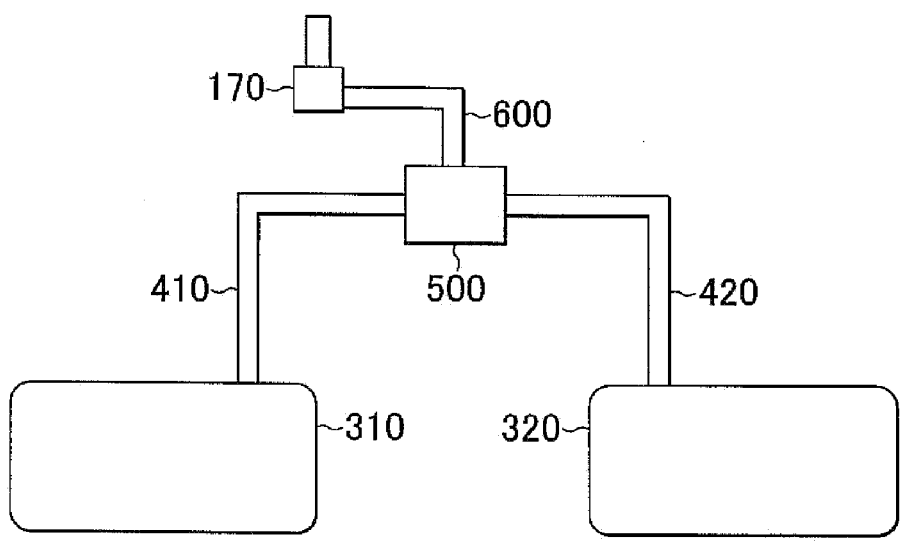
FIG. 4 is a schematic diagram showing a fuel supply system of an internal combustion engine to which an ignition timing control device in accordance with a second embodiment of the invention is applied.

Next, a second embodiment in which an ignition timing control device for an internal combustion engine in accordance with the invention is embodied will be described with reference to FIGS. 4 to 6.

A internal combustion engine 10 in the second embodiment has a fuel supply system that is different from the fuel supply system that the internal combustion engine 10 described above in the first embodiment has. Specifically, the internal combustion engine 10 in the second embodiment has a fuel supply system capable of switching between gasoline fuel and liquefied petroleum fuel (hereinafter, referred to as LPG fuel) as an engine fuel. At the time of the temperature correction of the ignition timing, the setting method for the timing retarding correction amount H is changed according to the kind of fuel that is used.

Hereinafter, an ignition timing control device of the second embodiment will be described mainly with regard to differences from the first embodiment. FIG. 4 shows a fuel supply system of the internal combustion engine 10 in the second embodiment. As shown in FIG. 4, the internal combustion engine 10 is provided with a first tank 310 and a second fuel tank 320. The first fuel tank 310 stores gasoline fuel, and the second fuel tank 320 stores LPG fuel.

The first fuel tank 310 is connected to a switching valve 500, via a first fuel supply passageway 410. The second fuel tank 320 is also connected to the switching valve 500, via a second fuel supply passageway 420. An injector 170 is connected to the switching valve 500, via a third supply passageway 600.

In this internal combustion engine 10, the switching valve 500 is switched on the basis of a switch signal so that one of the gasoline fuel and the LPG fuel is injected from the injector 170. The switch signal may be output from the control device 22. That is, one of the gasoline fuel and the LPG fuel is used as an engine fuel by switching the switching valve 500.

Figure 5:
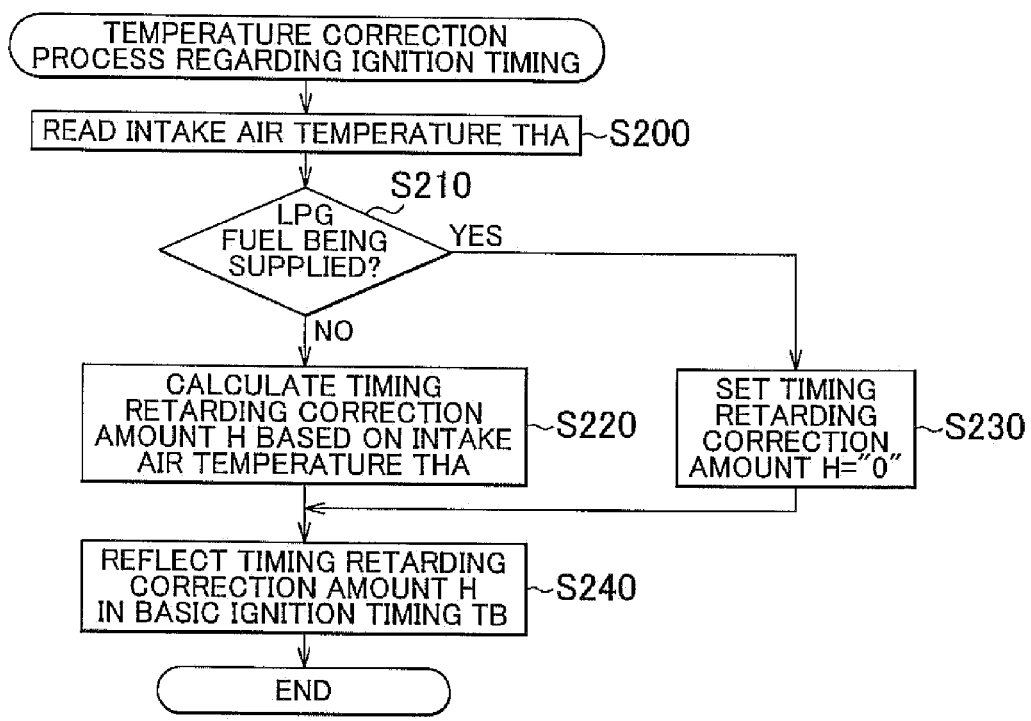
FIG. 5 is a flowchart showing a procedure of a temperature correction process with regard to the ignition timing in the second embodiment.

FIG. 5 shows a temperature correction process for the ignition timing in this embodiment. Incidentally, execution of this process is also repeated at every predetermined cycle by the control device 22. After this process is started, the intake air temperature THA is read (S200). Next, it is determined whether LPG fuel is presently being used (S210). This determination in step S210 is performed on the basis of the switch signal to the switching valve 500.

When LPG fuel is not being used, that is, when gasoline fuel is being used (NO in S210), the timing retarding correction amount H is calculated on the basis of the intake air temperature THA (S220). This timing retarding correction amount H is a value of the temperature correction of the ignition timing, similar to the timing retarding correction amount H in the first embodiment. As the timing retarding correction amount H is larger, the ignition timing is corrected to be more retarded so as to restrain occurrence of knocking.

Figure 6:
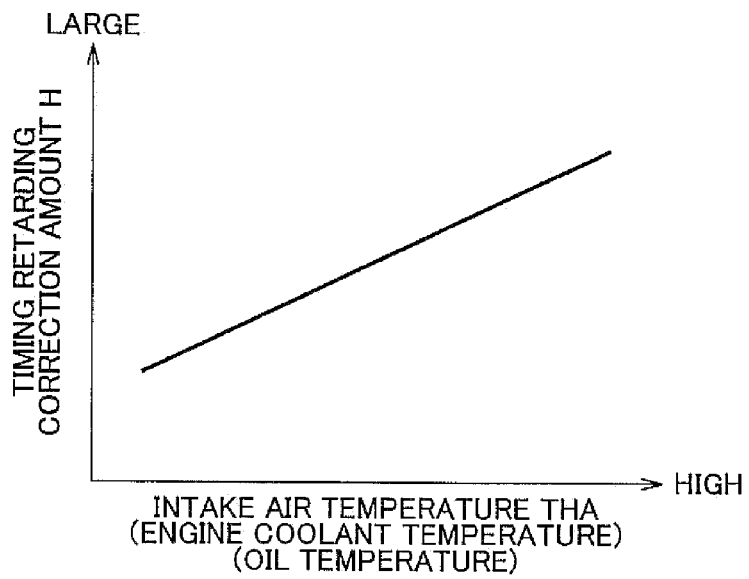
FIG. 6 is a conceptual diagram showing a relation between the intake air temperature and the timing retarding correction amount in the second embodiment.

In step S220, the value of the timing retarding correction amount H is set larger as the intake air temperature THA is higher, as shown in FIG. 6. As stated above, since knocking is more likely to occur as the intake air temperature THA is higher, the value of the timing retarding correction amount H is set larger and therefore the ignition timing is more retarded as the intake air temperature THA is higher.

On the other hand, in step S210, if it is determined that LPG fuel is being used (YES in S210), the timing retarding correction amount H is set at "0" (S230). Thus, when LPG fuel is being used as an engine fuel, the timing retarding correction amount H is set at "0", so that the temperature correction of the ignition timing is substantially prohibited.

After the timing retarding correction amount H is set in step S220 or step S230, the temperature correction of the basic ignition timing TB is performed in step S240 by correcting the basic ignition timing TB by the timing retarding correction amount H. After that, this process is temporarily ended.

Next, operation of the second embodiment will be described. LPG fuel is higher in octane number than gasoline fuel. Therefore, when LPG fuel is used as an engine fuel, knocking is unlikely to occur even when the intake air temperature THA is higher. Therefore, in the second embodiment, when LPG fuel is being used as an engine fuel, that is, when a fuel less prone to knocking is being used, the timing retarding correction amount H is set at "0". This substantially prohibits the retarding correction of the ignition timing according to the intake air temperature THA. Therefore, when a fuel less prone to knocking is being used, the reduction in engine output that results from the retardation of the ignition timing made by the temperature correction is restrained.

According to the above-described second embodiment, the following effects can be attained. The timing retarding correction amount H of the ignition timing is set according to the intake air temperature THA. The timing retarding correction amount H is set at "0" when LPG fuel is being used as an engine fuel. This prohibits the timing retarding correction of the ignition timing according to the intake air temperature THA. Therefore, it is possible to suppress reduction in engine output while suppressing occurrence of knocking. In the second embodiment, the processes in steps S210, S220 and S240 may be regarded as a retarding portion, and the processes in steps S210, S230 and S240 may be regarded as a prohibiting portion.

Incidentally, in the foregoing embodiments, the basic ignition timing TB is corrected by the timing retarding correction amount H. However, instead of correcting the basic ignition timing TB by the timing retarding correction amount H, it is also applicable to correct, through the use of the timing retarding correction amount H, the ignition timing obtained after correcting the basis ignition timing TB by the knocking correction amount KH.

Figure 7:
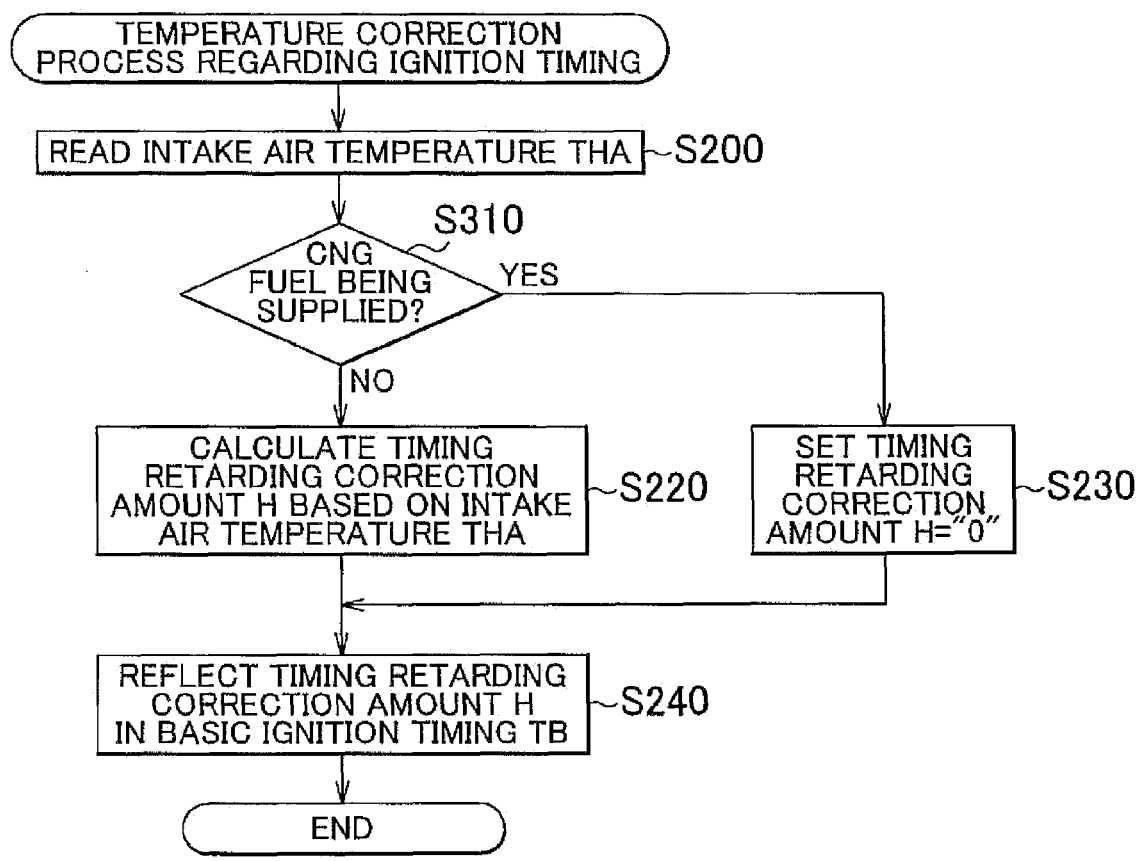
FIG. 7 is a flowchart showing a procedure of a temperature correction process with regard to the ignition timing in a modification of the second embodiment.

The internal combustion engine 10 described in the second embodiment has a fuel supply system that is capable of switching between gasoline fuel and LPG fuel as an engine fuel. Other kinds of fuels may also be used. For example, compressed natural gas fuel (hereinafter, referred to as CNG fuel) is higher in octane number than gasoline fuel. Therefore, when CNG fuel is supplied as an engine fuel, knocking is relatively unlikely to occur even when the temperature in the combustion chamber is high. Therefore, in the case where the internal combustion engine 10 has a fuel supply system that is capable of switching between gasoline fuel and CNG fuel as an engine fuel, substantially the same operation and effects as in the second embodiment can be attained by executing a temperature correction process of correcting the ignition timing shown in FIG. 7 (modification of the second embodiment).

That is, instead of step S210 described above with reference to FIG. 5, step S310 in which it is determined whether CNG fuel is being presently used is executed. Then, when CNG fuel is not being used, that is, when gasoline fuel is being used (NO in S310), the timing retarding correction amount H is calculated on the basis of the intake air temperature THA (S220). In this case, too, the timing retarding correction amount H is variably set (changed) so as to be larger as the intake air temperature THA is higher, as described above with reference to FIG. 6.

On the other hand, in step S310, if it is determined that CNG fuel is being used (YES in S310), the timing retarding correction amount H is set at "0" (S230). Thus, when CNG fuel is being used as an engine fuel, the temperature correction of the ignition timing is substantially prohibited by setting the timing retarding correction amount H at "0". In this modification, too, when CNG fuel is being used as an engine fuel, that is, when a fuel less prone to knocking is being used, the retarding correction of the ignition timing according to the intake air temperature THA is substantially prohibited by setting the timing retarding correction amount H at "0". Therefore, when a fuel less prone to knocking is being used, the reduction in engine output resulting from the retardation of the ignition timing made by the temperature correction can be suppressed. Therefore, it is possible to suppress reduction in engine output while suppressing occurrence of knocking. In the second embodiment, the processes in steps S310, S220 and S240 may be regarded as a retarding portion, and the processes in steps S310, S230 and S240 may be regarded as a prohibiting portion.

In the foregoing embodiments, the intake air temperature THA is used as a parameter that correlates with the temperature inside the combustion chamber. Besides the intake air temperature THA, examples of the parameter that correlates with the temperature inside the combustion chamber includes the engine coolant temperature and the oil temperature of the engine. Therefore, as a parameter that correlates with the temperature inside the combustion chamber, one of the intake air temperature THA, the engine coolant temperature and the oil temperature may be used. In this case, the timing retarding correction amount H is variably set (changed) so that the value of the timing retarding correction amount H is larger when the engine coolant temperature is higher or when the oil temperature is higher, as shown in FIG. 3 or FIG. 6 or the like. Furthermore, two or more of the intake air temperature THA, the engine coolant temperature and the oil temperature may also be used in combination. Besides, the second embodiment and its modification, in which LPG fuel or CNG fuel as an engine fuel that is higher in octane number than gasoline fuel is used interchangeably with gasoline fuel, have been described. It suffices that the fuel that is used interchangeably with gasoline fuel in the second embodiment is a fuel that is higher in octane number than gasoline fuel, that is, a high octane number fuel, and is not limited to LPG fuel or CNG fuel. Besides, it is also applicable that one of a plurality of kinds of high octane number fuels may be used interchangeably with gasoline fuel.

What is claimed is:

1. An ignition timing control device for an internal combustion engine, comprising:
    a retarding portion that retards ignition timing according to a parameter that correlates with temperature inside a combustion chamber of the internal combustion engine, the parameter is at least one of intake air temperature, engine coolant temperature, and oil temperature; and
    a prohibiting portion that prohibits the retarding portion from retarding the ignition timing when alcohol concentration in blended fuel in which an alcohol fuel and a gasoline fuel are blended at arbitrary proportion is greater than or equal to a predetermined value, wherein the blended fuel is used in the internal combustion engine.

2. The ignition timing control device according to claim 1, wherein:
    the retarding portion retards the ignition timing by a timing retarding correction amount; and
    when the alcohol concentration is less than the predetermined value, the timing retarding correction amount is set smaller as the alcohol concentration increases.

3. The ignition timing control device according to claim 1, wherein the arbitrary proportion includes 100% of the alcohol fuel and 100% of the gasoline fuel.

4. The ignition timing control device according to claim 1, wherein the predetermined value is set to a value at which knocking does not occur in a condition that the parameter is a highest temperature during operation of the engine.

5. The ignition timing control device according to claim 1, wherein the retarding portion retards the ignition timing by a timing retarding correction amount and sets the timing retarding correction amount larger as the parameter increases.

6. An ignition timing control device for an internal combustion engine, comprising:
    a retarding portion that retards ignition timing according to a parameter that correlates with temperature inside a combustion chamber; and
    a prohibiting portion that prohibits the retarding portion from retarding the ignition timing when the internal combustion engine is using a high octane number fuel that is higher in octane number than a gasoline fuel, wherein a fuel that the internal combustion engine uses is one of the gasoline fuel and the high octane number fuel.

7. The ignition timing control device according to claim 6, wherein the high octane number fuel is liquefied petroleum gas fuel or compressed natural gas fuel.

8. An ignition timing control method for an internal combustion engine, comprising:
    retarding ignition timing according to a parameter that correlates with temperature inside a combustion chamber of the internal combustion engine, the parameter is at least one of intake air temperature, engine coolant temperature, and oil temperature; and
    prohibiting the retarding when alcohol concentration in a blended fuel in which an alcohol fuel and a gasoline fuel are blended at arbitrary proportion is greater than or equal to a predetermined value, wherein the blended fuel is used in the internal combustion engine.

9. An ignition timing control method for an internal combustion engine, comprising:
    retarding ignition timing according to a parameter that correlates with temperature inside a combustion chamber of the internal combustion engine; and
    prohibiting the retarding when the internal combustion engine is using the high octane number fuel, wherein a fuel that the internal combustion engine uses is one of the gasoline fuel and the high octane number fuel.

* * * * *